United States Patent [19]

Carter

[11] Patent Number: 5,362,035
[45] Date of Patent: Nov. 8, 1994

[54] TUNABLE FRONT SUSPENSION STRUT MOUNT

[75] Inventor: Robert L. Carter, Gibraltar, Mich.

[73] Assignee: Chrysler Corporation, Highland Park, Mich.

[21] Appl. No.: 129,477

[22] Filed: Sep. 30, 1993

[51] Int. Cl.$^5$ ............................................. B60G 15/04
[52] U.S. Cl. ..................................... 267/220; 267/33; 267/293
[58] Field of Search ................. 267/220, 225, 33, 35, 267/292, 293, 294, 141, 141.2; 188/321.11; 280/668

[56] References Cited

U.S. PATENT DOCUMENTS

| | | | |
|---|---|---|---|
| 4,274,655 | 6/1981 | Lederman | 280/688 |
| 4,434,977 | 3/1984 | Chiba et al. | 267/220 X |
| 4,465,296 | 8/1984 | Shiratori et al. | 280/668 |
| 4,478,396 | 10/1984 | Kawaura | 280/668 |
| 4,568,067 | 2/1986 | Iwata | 267/220 |
| 4,747,587 | 5/1988 | Ferrel | 267/220 |
| 4,934,730 | 6/1990 | Okuzumi | 280/668 |
| 5,000,429 | 3/1991 | Wittmar et al. | 267/220 |
| 5,078,370 | 1/1992 | McClellan | 267/220 |
| 5,100,114 | 3/1992 | Reuter et al. | 267/293 |
| 5,190,269 | 3/1993 | Ikeda et al. | 267/293 X |

FOREIGN PATENT DOCUMENTS

| | | | |
|---|---|---|---|
| 0178410 | 8/1987 | Japan | 267/220 |
| 0286816 | 12/1987 | Japan | 267/33 |
| 0527468 | 10/1940 | United Kingdom | 267/33 |

*Primary Examiner*—Robert J. Oberleitner
*Assistant Examiner*—Peter M. Poon
*Attorney, Agent, or Firm*—Edward P. Barthel

[57] ABSTRACT

An automotive suspension strut upper mounting arrangement providing a one-piece elastomeric block isolator adapted for enclosure in a two-piece housing comprising upper and lower closure members. The isolator, which has a central generally tubular shape, is molded with an upper jounce collar and a lower rebound collar. A continuous internal radially extending tuning groove is formed in the jounce and rebound collars. By varying the axial dimension of the grooves the mount axial spring rate may be fine tuned to smoothly receive axially imposed suspension loads. Additionally, the isolator body outer surface may formed with a plurality of recesses defining predetermined voids providing selective tuning of laterally imposed suspension loads.

1 Claim, 1 Drawing Sheet

TUNABLE FRONT SUSPENSION STRUT MOUNT

BACKGROUND OF THE INVENTION

This invention relates to automotive suspensions and, more particularly, to an improved suspension strut upper support mount for hydraulic suspension dampers providing increased stroke length and mount oscillating and side load tunability.

An example of a suspension strut upper support mount having an improved spring characteristic is found in U.S. Pat. No. 4,465,296 issued Aug. 14, 1984 to Shiratori et al. The invention provides a rubber block having a predetermined configuration for receiving oscillating loads in a relatively smooth manner.

The U.S. Pat. No. 4,747,587 issued May 31, 1988 to Farrell, assigned to the assignee of the present application, discloses a low profile strut isolator and jounce bumper upper mount providing a compact resilient assembly adaptable for a vehicle having a reduced hood line.

The U.S. Pat. No. 4,478,396 issued Oct. 23, 1984 to Kawaura discloses an elastic support structure for a vehicle suspension shock comprising a first rigid member to be subjected to shocks and vibrations produced in a wheel assembly, a second rigid member to which shocks and vibrations may be transferred from the first rigid member, and an elastic member composed of a least two segments similar in geometry constructed independently of each other formed with annular grooves.

The U.S. Pat. No. 5,078,370 issued Jan. 7, 1992 to McClellan is an example of a vehicle front suspension strut having integrated jounce and rebound stops. In the McClellan patent, the suspension spring rebound load is placed on a lower rebound stop member of the mount and the suspension jounce load is placed on an upper jounce stop member of the mount.

The U.S. Pat. No. 4,934,730 issued Jun. 19, 1990 to Okuzumi is an example of a vehicle front suspension strut wherein the upper end of the strut piston rod is engaged in an inner sleeve of a mount insulator for limited axial movement relative to the inner sleeve.

SUMMARY OF THE INVENTION

It is an object of the present invention to provide an improved upper mount assembly for a vehicle suspension strut enabling its spring rate to be tuned by means of jounce and rebound radial collars being formed with continuous internal jounce and rebound grooves to smoothly receive axially imposed suspension loads.

It is a further object of the present invention to provide an improved upper mount assembly, as set forth above, wherein the major working area of the shock mount is located above the shock tower attachment surface.

It is another object of the present invention to provide an improved upper mount assembly for a vehicle suspension strut wherein the mount has a one-piece elastomeric block isolator subjected to axial resilient pre-load bias upon its enclosure by upper and lower housing members.

It is still another object of the present invention to provide an improved upper mount assembly for a vehicle suspension, as set forth above, wherein the shock length is increased as the major portion of the working area is located above the tower attachment surface for a given installation.

These and other objects and advantages of the present invention will be readily apparent by reference to the following description of the preferred embodiment and the accompanying drawing which shows, mostly in cross section, a vehicle suspension strut incorporating the improved upper mount.

DETAILED DESCRIPTION OF THE INVENTION

Figure 1:
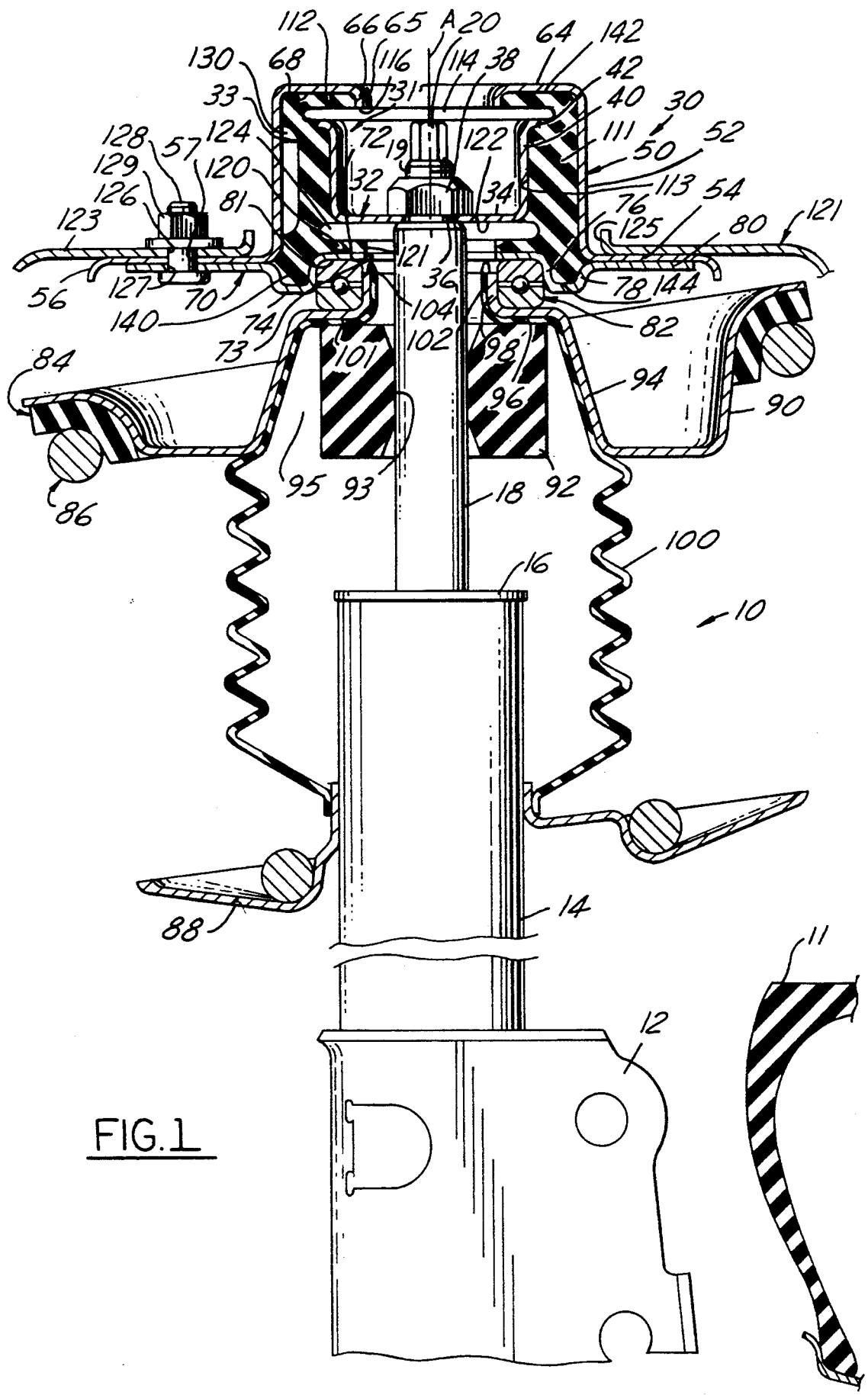

Referring now to the only drawing, there is shown a portion of a vehicle front suspension incorporating a hydraulic shock absorbing damper or shock 10 interconnecting the vehicle sprung mass or body portion and a vehicle unsprung mass supported by a front wheel 11. The damper shock 10 comprises a mounting bracket 12 connected to a steering knuckle (not shown). The mounting bracket provides a lower support for outer cylindrical support tube 14 of the shock which extends upwardly therefrom with the tube secured in the lower bracket as by welding. The upper end of the support tube 14 is closed by upper cap 16, welded or otherwise, secured to the support tube. Reference may be had to the U.S. Pat. No. 5,078,370, mentioned above, which patent discloses details of conventional shock absorber components and is incorporated by reference herein.

A cylindrical piston rod 18 extends axially upwardly from a conventional valved piston (not shown) slidably mounted in a cylindrical inner tube (not shown) radially spaced inwardly from the support tube 14 provides a reservoir for the hydraulic dampening fluid of the shock. The piston rod 18 has a reduced diameter threaded upper end 20 removably attached to a shock mount assembly, generally indicated at 30, which is the subject of the present invention. The shock mount assembly comprises a two-part housing, in the form of upper and lower closure members formed of sheet metal, adapted to house a free one-piece rubber block isolator in a pre-loaded manner.

As seen in FIG. 1, the upper mount assembly 30 provides an annular inner cup 32 concentrically disposed about the shock principal axis "A". The inner cup 32 comprises a lower closed bottom wall 34 formed with a central hole 36 having its center aligned on the shock axis so as to receive therethrough the piston rod upper end 20 for threaded attachment by nut 38. The cup 32 has an upstanding cylindrical inner side wall 40 terminating at its upper end in jounce stop means in the form of an annular outwardly bent radial flanged lip portion 42.

The hat-shaped upper closure member, generally indicated at 50, has a cylindrical axially upstanding outer wall portion 52 disposed concentrically around the cup inner side wall 40 defining an annular space therebetween. The upper closure member wall portion 52 has its lower end terminating in a radially outwardly extending attaching flanged brim 54 formed at its outer peripheral edge with a downstanding radiused flange 56 providing additional stiffness to the upper closure member 50. The flanged brim 54 has a plurality of spaced holes 57.

The upper closure member 50 terminates at its upper end in a horizontal annular cap ring 64 forming a central access aperture 65 defined by an annular downstanding axial flange rim 66. It will be seen that the axial rim 66 and the radially opposed portion of side wall 52 define an upper continuous annular inverted U-sectioned jounce cavity 68 the function of which is explained below. It will also be observed that the axial rim 66 has a predetermined diameter intermediate the diameter of the inner cup upstanding wall 40 and the nut 38.

The lower closure member, indicated generally at 70, defines an annular base panel 72 having a central opening 73 concentrically disposed about the principal axis "A". The central base panel 72 is shown encircled by a countersunk U-sectioned continuously formed annular channel portion 74. The channel portion 74 is defined by an interior upstanding channel wall 76, having a first axial extent, and an exterior upstanding channel wall 78, having a second axial extent. It will be noted that the axial extent of the interior wall 76 is about twice the axial extent of the exterior wall 78.

The exterior channel wall 78 terminates at its upper end in a radially outwardly extending peripheral flange 80 in subjacent flatwise contact with the underside of the cover member flanged brim 54. The central base panel 72 defines a downwardly facing lower annular cavity sized to snugly receive therein a circular ball bearing ring assembly 82 concentrically disposed about the axis "A".

An upper annular spring seat assembly 84 is resiliently supported on the upper end coil of an helical suspension spring generally indicated at 86. The suspension spring 86 spirals around the shock outer support casing 14 and extends upwardly from an annular lower spring support seat member 88 welded or otherwise secured to the support casing 14 above the mounting bracket 12.

The upper spring seat assembly 84 comprises a sheet metal U-sectioned through member 90 concentrically surrounding an elastomeric jounce bumper 92. The bumper has a central hole 93 receiving, in a press fitting manner, an upper portion of the piston rod 18. An inner sloped trough wall 94 of the upper spring seat assembly defines a downwardly opening annular socket 95 having a predetermined size for receiving the jounce bumper 92. The upper spring seat socket 95 is designed to contain the jounce bumper 92 therein such that it will limit its radial expansion during loading in a predetermined tuned manner.

The spring seat inner trough wall 94 terminates at its upper end in a L-shaped right angled annular flange providing a radially inwardly extending shelf portion 96 and an axially upstanding riser portion 98. The L-shaped flange provides an annular externally facing groove sized to seat the ball bearing ring assembly 82.

A dust tube 100, made of suitable elastomeric material, has its upper end formed with a right-angled collar defining a radial inward extending portion 101 and an upright cylindrical portion 102. The upright portion 102 has its upper end formed with a retaining detent 104 which snap-fits over the upper edge of the riser portion 98.

A resilient cylindrical shaped rubber block isolator molded of suitable deformable elastomeric material such as natural or synthetic rubber, has an annular tubular body portion 111. The tubular body portion 111 has an axial bore 113 of a predetermined diameter adapted to snugly receive the cup side wall 40 therein in a press-fit manner. The isolator tubular portion 111 has a predetermined outer diameter adapted to be telescopically received within the cover member cylindrical wall portion 52 in a press-fit manner so as to radially compressed between the cover outer wall 52 and the cup inner wall 40.

It will be noted that the isolator body portion 111 has a predetermined vertical extent terminating at its upper end in a radially inwardly extending annular jounce collar 112 sized for snug capture in the upper cavity 68. The jounce collar has a continuously formed annular radially extending upper internal void or groove 114. The annular jounce groove 114, having a predetermined depth, is axially positioned intermediate the jounce stop flange 42 and circular free edge 116 of the downstanding axial rim 66. It will be appreciated that by changing the axial dimension of the jounce groove 114 the suspension mount 30 may be varied so as to tune its jounce spring rate characteristic.

In a similar manner, the isolator body portion 111 terminates at its lower end in an annular radially inwardly projecting integral annular rebound collar 120. The rebound collar 120 is shown axially sandwiched between the underside 122 of the cup bottom wall 34 and the central base panel 72. A continuously formed annular lower internal void or rebound groove 124 of predetermined radial depth and axial dimension is located in the rebound collar 120 such that its upper internal limit is coextensive with the underside 122 of the cup bottom wall 34. Thus, the rebound spring rate characteristic of the suspension mount may be tuned by varying the axial dimension of the lower internal rebound groove 124.

The isolator tubular body outer surface 113 is also formed with a plurality of vertically extending circumferentially spaced elongated outer voids or side recesses 130 each having a predetermined radial depth, axial length, and arcuate angle. It will be appreciated that by varying any or all of the three factors of the side recesses 130 the fore and aft or transverse spring rate of the suspension mount may be tuned.

The isolator body 111 terminates at its lower end in an axially depending annular shaped lower tubular portion 140 having a predetermined radial extent sized for snug conforming capture in the annular channel portion 74 of the lower closure member 70. It will be noted that the lower tubular portion 140 has a predetermined outer diameter equal to the outer diameter of the isolator body outer surface 113.

The overall axial height of the isolator, measured between upper end surface 142 of the jounce collar 112 and lower end surface 144 of the tubular portion 140, is a predetermined dimension greater than the maximum internal axial dimension of the two-piece housing. By virtue of this arrangement, upon the isolator being confined in the assembled housing a resilient axial biasing pre-load is applied to the isolator insuring its tight press-fit encapsulation in the housing.

The mount attaching flanged brim 54 is adapted to be removably fixed to a vehicle panel member such as a shock mounting tower 122 forming a part of the vehicle sprung body. The shock tower 122 provides its upper panel 123 with a flanged opening 124 surrounded by a plurality of bolt holes, one of which is shown at 126. Each hole 127 in peripheral flange 80 is aligned with a hole 127 in the brim flange 54 to receive an associated upstanding bolt 128. The mount assembly 30 is readily secured to the shock tower 122 upon upper closure member 50 being telescopically inserted from below in shock tower opening 124 and each bolt 128 inserted in its associated panel hole 126 and nut 129 threaded thereon.

While only one embodiment of the present invention has been described, other embodiments and modifications are possible without departing from the scope of the appended claims.

What is claimed is:

1. In a vehicle telescoping shock absorbing suspension strut operatively connected between sprung and unsprung masses of a vehicle along a principal axis defined by the strut, the strut having an outer support casing operatively connected to said vehicle unsprung mass and an inner cylindrical tube fixed in said support casing having a hydraulic dampening fluid therein, a valved piston mounted for sliding reciprocal movement in said inner cylinder tube, a piston rod operatively connected to said piston with its upper end extending through one upper end of said cylinder tube and support casing, an upper mounting assembly for said piston rod adapted for attachment to said sprung mass, said mounting assembly comprising:

a two piece housing providing upper and lower sheet metal closure members enclosing an inner cylindrical cup, said cup having a bottom wall formed with a central hole the center of which is aligned on said axis receiving therethrough and attached thereto an upper end of the piston rod, said cup formed with a cylindrical side wall having an upper open end thereof terminating in an outturned flanged lip portion defining a jounce stop;

said upper closure member having a cylindrical upstanding outer wall disposed concentrically around said cup side wall defining an annular space therebetween, said outer wall terminating at its lower end in a radially outwardly extending annular flanged brim and terminating at its upper end in a radially inwardly extending annular cap web, said cap web having a central access aperture bordered by a downturned flanged rim which defines, together with a radially opposed portion of said upper closure side wall, a continuous inverted channel defining an annular upper jounce cavity;

said lower closure member comprising a central circular base panel having a central aperture receiving said piston rod therethrough, said base panel provided with a radially outward extending peripheral flange positioned in flatwise engagement with an undersurface of said closure member flanged brim;

said base panel bordered by a continuous annular channel portion bounded on the interior by an inner channel wall and on the exterior by an outer channel wall, said outer channel wall terminating in said flanged brim, said base panel and said channel inner wall defining a downwardly opening annular socket sized to snugly receive therein a circular ball bearing ring assembly;

an elastomeric isolator ring having a cylindrical tubular-shaped body portion fitted in said annular space, said isolator body portion upper end terminating in a radially inwardly extending jounce-collar received in a snug conforming manner in said upper jounce cavity, said jounce collar having a continuously formed annular internal oscillation jounce tuning groove provided therein located axially intermediate said jounce stop and a lower edge of said top ring flanged rim;

said isolator ring body portion having a radially inwardly extending rebound collar formed adjacent its lower end, said rebound collar positioned in a snug conforming manner between said cup bottom wall and said central base panel and having a central circular opening of predetermined diameter, said rebound collar formed with a continuous annular internal oscillation rebound tuning groove provided therein;

said isolator terminating at its lower end in an axially depending annular shaped tubular portion in snug conforming reception in said base panel annular channel portion;

said isolator having a predetermined overall axial dimension slightly greater than the maximum internal axial dimension of said housing such that said isolator is enclosed in said housing in a resilient press-fit manner by virtue of an axial pre-load being applied to said isolator by said upper and lower closure members;

whereby said jounce and rebound grooves may be varied in axial depth such that said mounting assembly spring rate may be selectively tuned to smoothly receive axially imposed suspension loads; and wherein said isolator tubular body portion cylindrical side surface having formed therein a plurality of circumferentially spaced vertically extending side recesses having a predetermined axial dimension so as to be positioned intermediate said upper jounce groove and said lower rebound groove, said recesses providing, with an interior surface of said upper closure member outer wall, a plurality of voids, whereby said mounting assembly spring rate may be tuned to smoothly receive transversely imposed suspension loads.

* * * * *